(12) United States Patent
Kleiger

(10) Patent No.: US 9,091,030 B2
(45) Date of Patent: Jul. 28, 2015

(54) MINI PATCHER FOR PATCHING POTHOLES AND THE LIKE AND METHOD FOR PERFORMING SAME

(75) Inventor: Scott P. Kleiger, Harleysville, PA (US)

(73) Assignee: Patch Management, Inc., Fairless Hills, PA (US)

( * ) Notice: Subject to any disclaimer, the term of this patent is extended or adjusted under 35 U.S.C. 154(b) by 40 days.

(21) Appl. No.: 13/812,770

(22) PCT Filed: Jul. 28, 2011

(86) PCT No.: PCT/US2011/045699
§ 371 (c)(1),
(2), (4) Date: Jun. 7, 2013

(87) PCT Pub. No.: WO2012/016025
PCT Pub. Date: Feb. 2, 2012

(65) Prior Publication Data
US 2014/0301783 A1 Oct. 9, 2014

Related U.S. Application Data

(60) Provisional application No. 61/368,439, filed on Jul. 28, 2010.

(51) Int. Cl.
*B29C 31/02* (2006.01)
*E01C 23/10* (2006.01)
*E01C 23/06* (2006.01)
*B65D 88/26* (2006.01)
*B65G 65/40* (2006.01)

(52) U.S. Cl.
CPC ............... *E01C 23/10* (2013.01); *B65D 88/26* (2013.01); *B65G 65/40* (2013.01); *E01C 23/06* (2013.01)

(58) Field of Classification Search
CPC ........ B65D 65/40; B65D 88/26; E01C 23/06; E01C 23/10
USPC ...................... 404/107–111; 180/65 R, 65.21
See application file for complete search history.

(56) References Cited

U.S. PATENT DOCUMENTS

| | | |
|---|---|---|
| 3,564,985 A | 2/1971 | Heller |
| 3,874,472 A | 4/1975 | Deane |
| 5,419,654 A | 5/1995 | Kleiger |
| 2004/0046394 A1 | 3/2004 | Lim |

(Continued)

FOREIGN PATENT DOCUMENTS

WO 2010/081674 A1 7/2010

*Primary Examiner* — Raymond W Addie
(74) *Attorney, Agent, or Firm* — Volpe and Koenig, P.C.

(57) ABSTRACT

A patcher capable of performing patching operations even when operating in confined spaces and having a pressurized aggregate storage tank and driving devices for opening and air-tightly closing the tank lid and locking/unlocking the tank lid in proper sequence. Tandem linear accelerators control the flow of aggregate from the tank to a dispensing outlet. An articulated boom assembly is operated to position an aggregate dispenser over the repair location. The boom assembly is movable to a vertical position to prevent the assembly from extending beyond the right and left sides of the patcher to provide a safe condition when travelling during a non-patching operating mode. All of the electrically-operated devices on the patcher derive energy from a common battery pack which is charged by the patcher engine during a non-patching mode and alternatively during a patching mode when the stored energy in the battery pack drops below a given threshold.

11 Claims, 10 Drawing Sheets

(56) References Cited

U.S. PATENT DOCUMENTS

| | | | |
|---|---|---|---|
| 2005/0163565 A1* | 7/2005 | Quenzi et al. | 404/84.1 |
| 2006/0008323 A1* | 1/2006 | Torvinen | 404/75 |
| 2008/0031688 A1 | 2/2008 | Gilchrist | |

* cited by examiner

US 9,091,030 B2

MINI PATCHER FOR PATCHING POTHOLES AND THE LIKE AND METHOD FOR PERFORMING SAME

CROSS REFERENCE TO RELATED APPLICATION

This application is a 35 U.S.C. §371 National Phase application of PCT/US2011/045699, filed Jul. 28, 2011 which claims the benefit of U.S. Provisional Application Ser. No. 61/368,439, filed Jul. 28, 2010, which are incorporated by reference as if fully set forth herein.

FIELD OF INVENTION

The present invention relates to patchers, and more particularly, to mini-patchers capable of selectively dispensing aggregate and/or liquid emulsion and method for performing same.

BACKGROUND

Patchers are well known in the field for repairing potholes and the like. Conventional patchers are typically provided with emulsion and aggregate tanks and the means for conveying their contents, either selectively or in combination to dispensing apparatus. For example, Applicant's U.S. Pat. No. 7,544,253, issued Jun. 9, 2009, teaches self-propelled patcher apparatus having the above-mentioned capabilities and is incorporated herein by reference.

In order to dispense aggregate in a positive and highly efficient manner by use of air pressure, it is necessary to be able to pressurize the aggregate tank, necessitating the provision of an air-tight seal. Air tight seals for tanks used to store and deliver liquids, such as an emulsion employed in patching operations, typically have a relatively small opening relative to the overall size of the tank storing the emulsion so that the closure for air tightly sealing the opening provided to deliver fresh emulsion into the tank is quite simple in design and yet quite effective in providing the necessary air tight seal.

In contrast, it is necessary to provide a large opening in order to rapidly and efficiently feed fresh aggregate into the aggregate tank. This is typically accomplished by providing a large opening sealed by a lid typically pivotally mounted to the top of the aggregate tank. It is conventional to provide a gasket for sealing the mating surfaces of the lid and the top lip of the opening in the aggregate tank to provide an adequate air-tight seal.

Manually operable clamping devices have typically been used in conventional systems. However, this necessitates providing a number of independent clamping devices at spaced locations about the aggregate tank lid, necessitating multiple manual operations when opening and closing the tank lid. It is, therefore, one objective of the present invention to provide clamping apparatus for automatically and simultaneously clamping and unclamping the aggregate tank lid to achieve an air-tight seal through a single opening or closing operation.

Another objective of the present invention is to provide a drive source which automatically closes the aggregate tank lid and, upon closure, automatically clamps the aggregate tank lid to assure an air-tight seal responsive to the lid reaching the closed position.

Still another objective of the present invention is to provide a novel actuator mechanism for opening and closing the aggregate tank outlet opening through the utilization of first and second linear accelerators arranged in tandem to provide opening and closing control, as well as a regulating the size of the opening to control rate of flow of aggregate.

Utilization of electrically powered linear accelerators opening in tandem enables operation of the patcher vehicle using exclusively electric power during a patching mode, including movement of the patcher vehicle during the patching mode.

BRIEF DESCRIPTION OF THE DRAWINGS

The above as well as other objects of the invention will become apparent from the accompanying description and drawings in which:

FIG. 2A-2 is a view of the rear end of the aggregate tank showing the aggregate tank lid closed.

DETAILED DESCRIPTION OF THE PREFERRED EMBODIMENTS

Figure 1A:
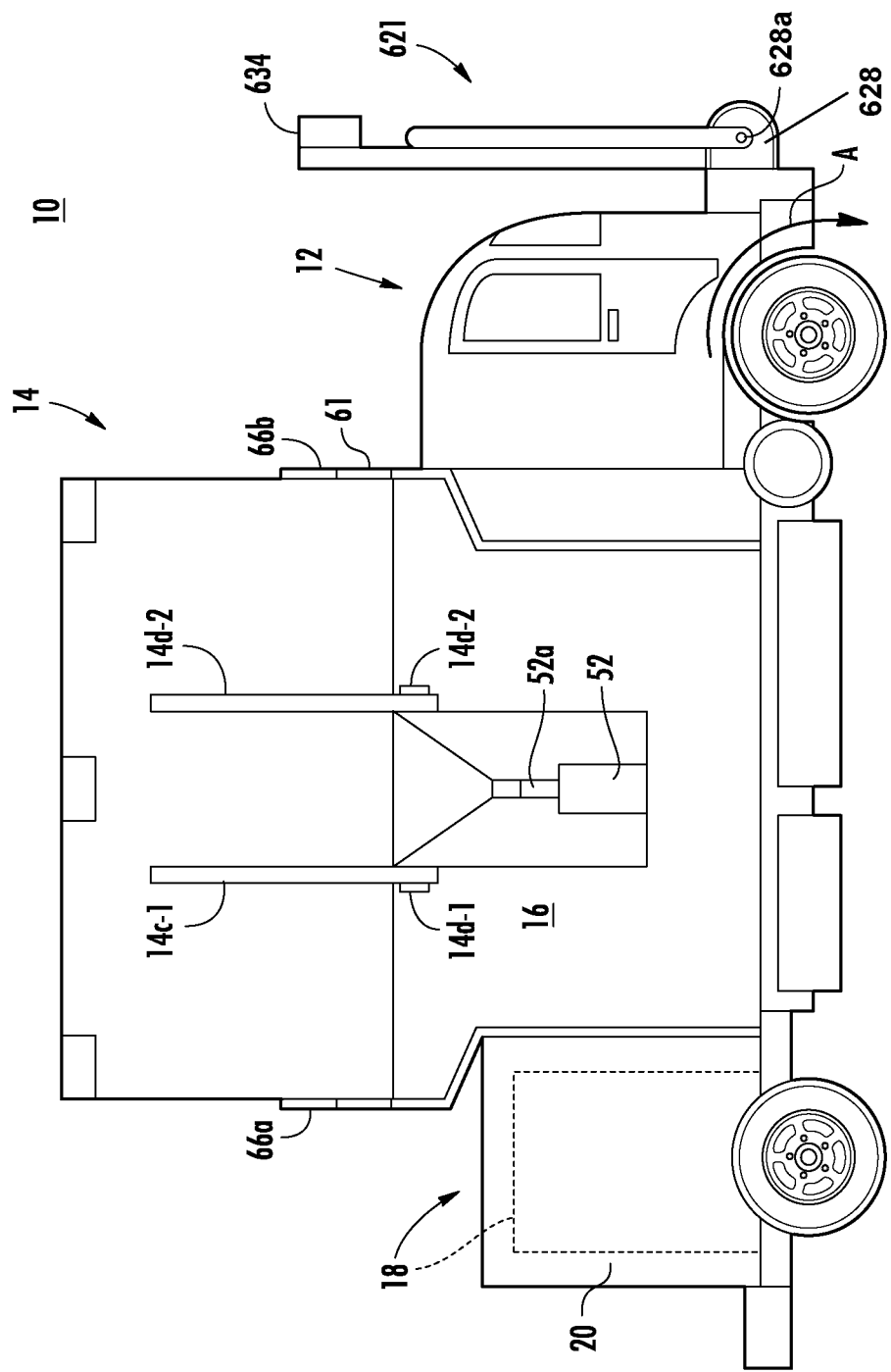
FIG. 1A is a side view of one embodiment of a patcher vehicle incorporating the principles of the present invention.

FIG. 1A shows a patcher 10 which, while significantly reduced in overall size and length as compared with the patcher described in U.S. Pat. No. 7,544,253, nevertheless has all of the capabilities of the patcher described in the last-mentioned issued patent while also being capable of maneuvering in confined spaces that prevent use of larger patchers of the type disclosed in U.S. Pat. No. 7,544,253.

The patcher 10, as shown in FIG. 1A, is comprised of a cabin 12 configured to accommodate a driver and a coworker, although only one person can easily operate patcher 10, due to its unique design. The cabin 12 is fitted with conventional driver controls such as ignition, steering wheel, gear shift mechanism, foot pedals and the like, not shown for purposes of simplicity. The cabin 12 is further fitted with an electronic controller 100 preferably located between the seating area for the driver and passenger and is controlled by a "joystick" 40 shown in FIG. 1C. Joystick 40 is independently movable in a forward/reverse direction D1 and a lateral left/right direction D2 perpendicular to the forward/reverse direction D1, as well as any combination of directions D1 and D2, such as a diagonal direction D3.

Figure 6A:
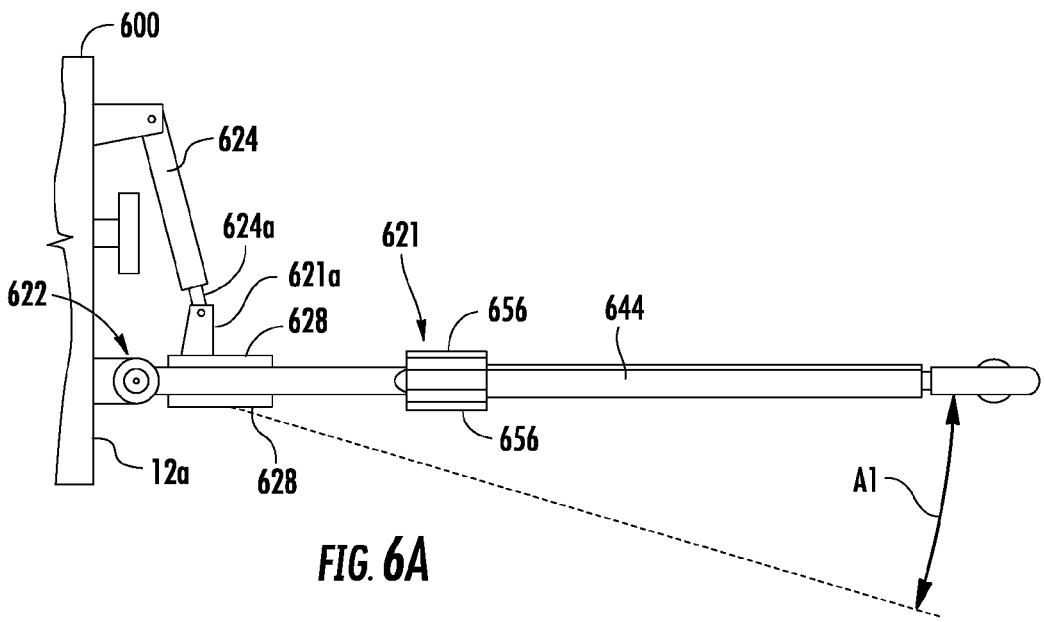
FIGS. 6A-6C respectively show top, front and side views of the articulated patching boom assembly mounted at the front end of the patcher in greater detail.
Figure 6B:
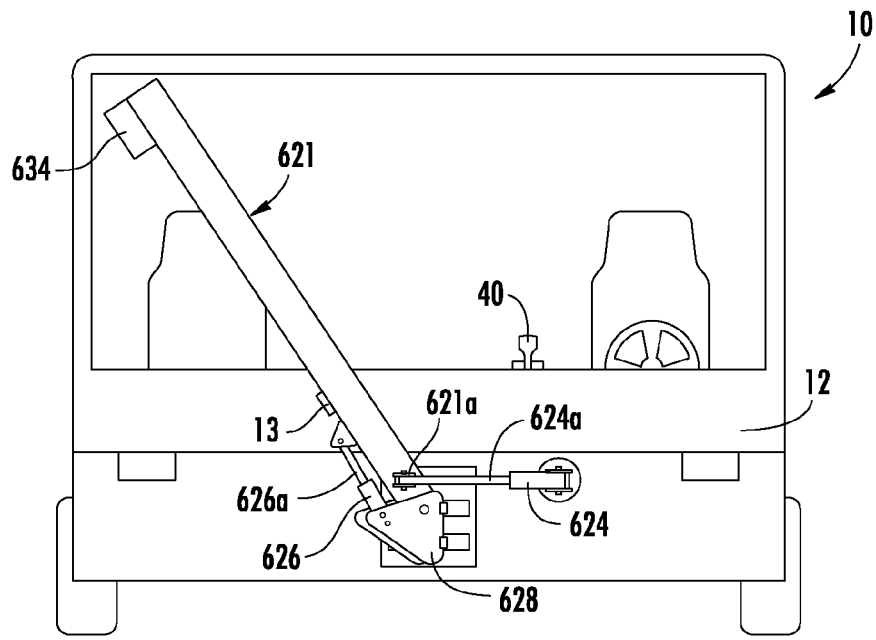

For example, as shown in FIGS. 6A and 6B, joystick movement in direction D1 can operate an electrically controlled linear actuator or a hydraulic cylinder 626 to raise/lower an articulated patching boom assembly 621; joystick movement in direction D2 can operate an electrically controlled linear actuator or a hydraulic cylinder 624 to move the articulated patching boom assembly 621 laterally left/right; and joystick movement in direction D3 can operate both linear actuators or cylinders 626 and 624 to move in the vector direction D3. Button array 43 can include buttons 43a, 43b, 43c operatively configured for dispensing only aggregate, only emulsion, both aggregate and emulsion, air under pressure (to blow debris out of a pothole) and the like.

Figure 1B:
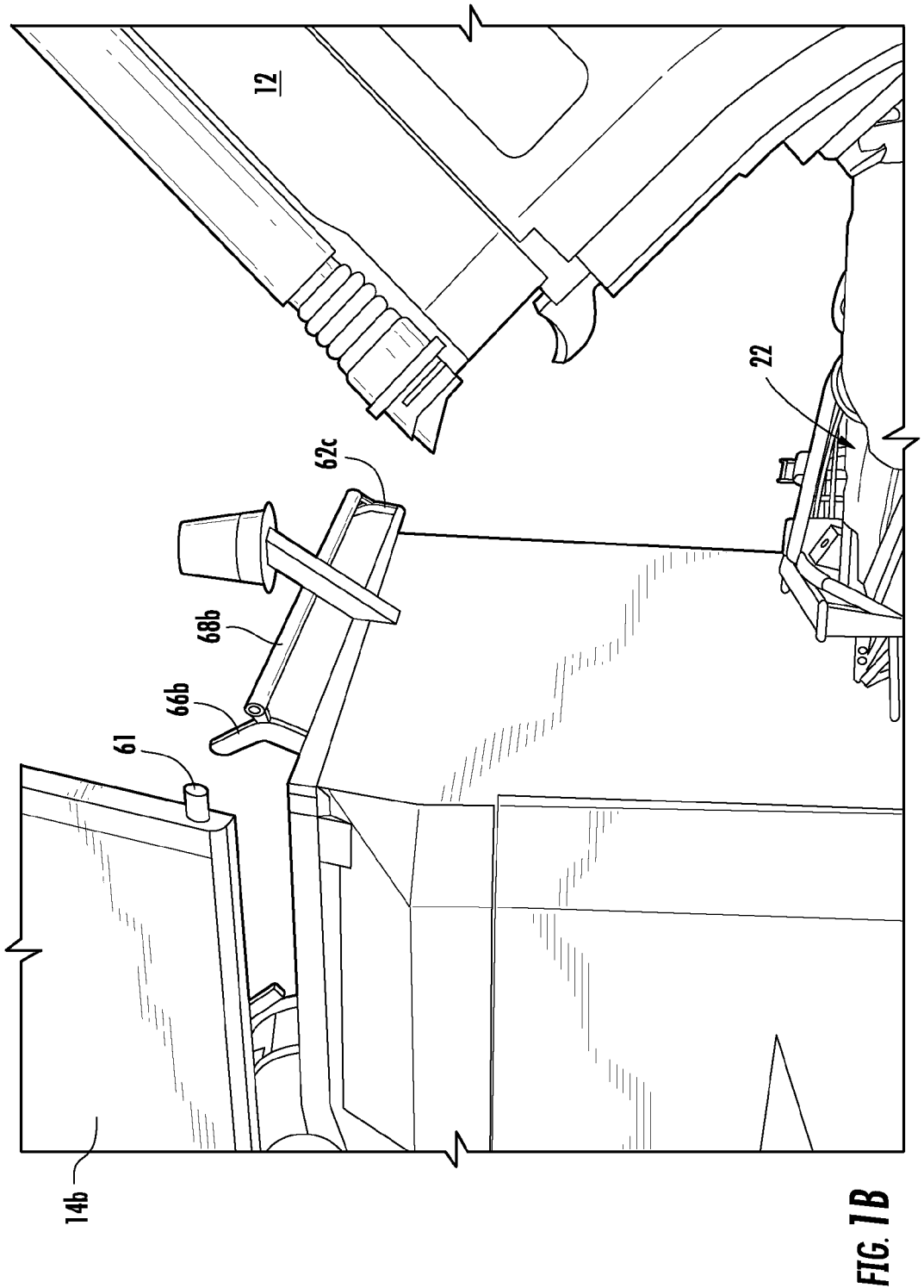
FIG. 1B is a side view of the patcher of FIG. 1 showing the cabin tilted forward to expose the patcher engine and related components.
Figure 1C:
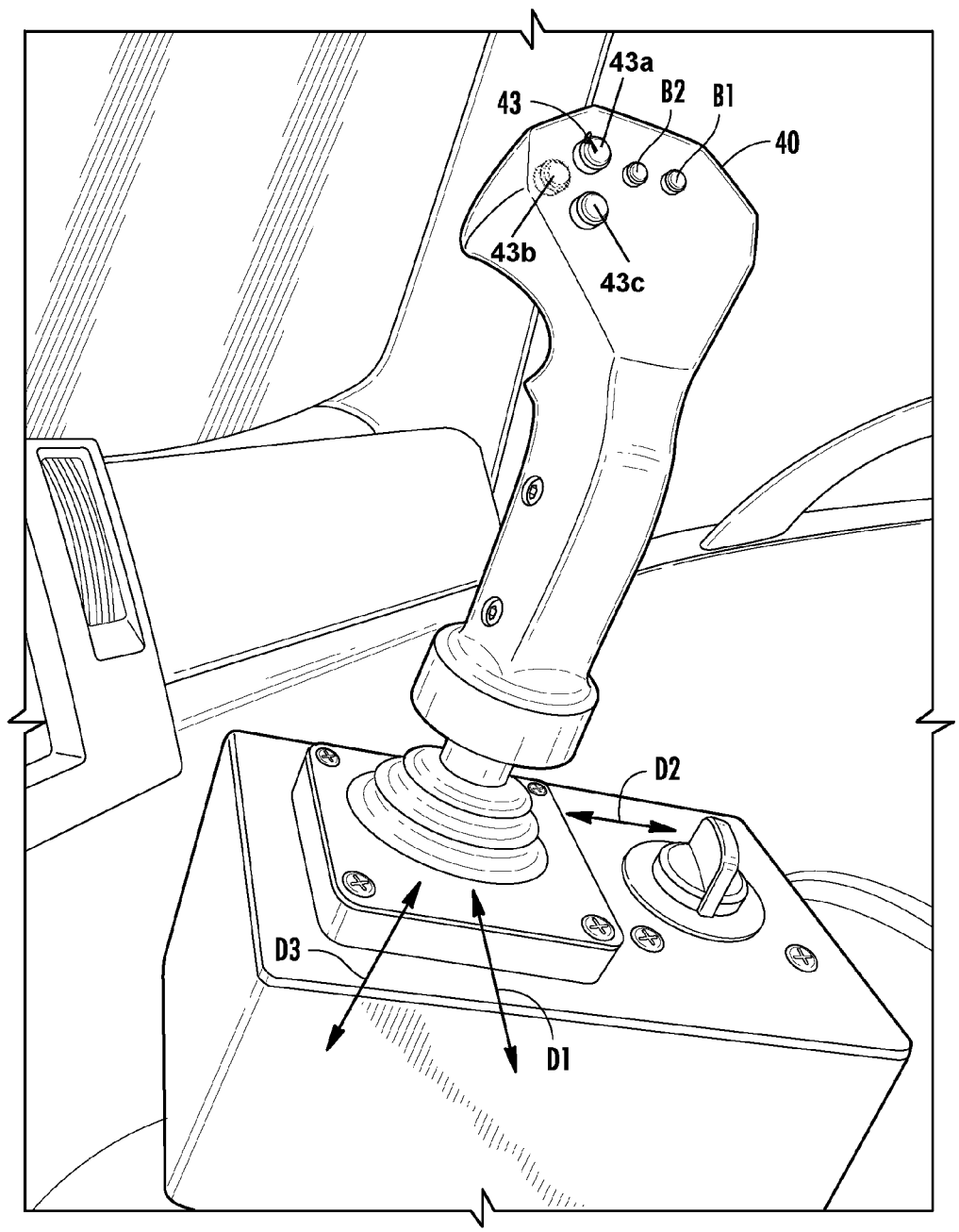
FIG. 1C is a perspective view showing the "joystick" for the controller.
Figure 1D:
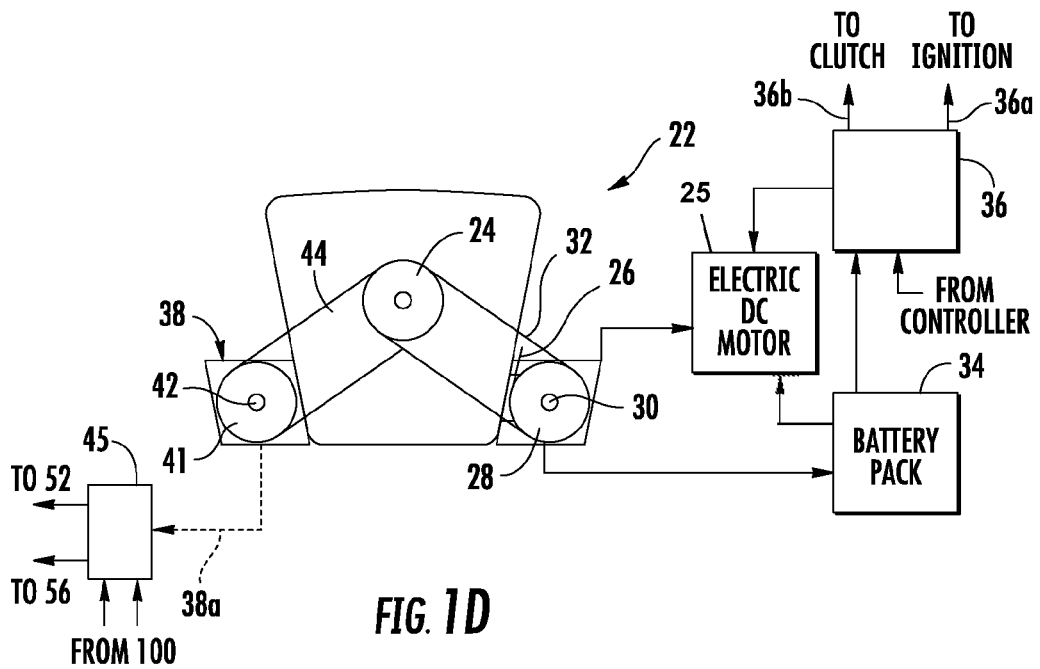
FIG. 1D shows the manner in which hydraulic power and electric charging power is derived from the patcher engine.

The cabin 12 is pivotally mounted to swing clockwise from the operating (closed) position shown in FIG. 1A, as shown by arrow A, to an open position shown in FIG. 1B to gain access to the patcher engine 22, shown in FIG. 1D, as well as other mechanisms and assemblies positioned behind cabin 12.

Patcher 10 is further provided with a pressurized, aggregate storage tank 14 substantially surrounded by an exterior wall 16, FIGS. 2A-2D showing the aggregate tank 14 with the exterior wall 16 removed. Pressurized air is preferably delivered to aggregate tank 14 directly from an air brake supply of an air brake system (either with or without any reduction in pressure), not shown for purposes of simplicity. Preferably, air pressure of the order of 120 psi is delivered to an air line communicating with the interior of aggregate tank 14. Pressurized air may alternatively be provided either by a motor mechanically driven by engine 22 or a motor/generator mechanically driven by engine 22 to provide electrical energy to a compressor or power derived from battery pack 34.

An emulsion storage tank 18 is positioned to the rear of aggregate tank 14 and is likewise enclosed within an external wall 20, emulsion tank 18 being shown in dotted fashion in FIG. 1A.

Patcher 10, in one embodiment, is provided with a conventional engine 22 such as a gas-piston or diesel-type engine suitable for propelling the patcher 10, at least when in the non-patching mode, to move the patcher at conventional road or highway speeds typically for travel between a home base and a location where patching operations are to be performed.

Preferably, the patcher 10 is configured to perform all of the patching functions, including movement of patcher 10 under electric power when in the patching mode and to control all of the patching functions from the cabin 12.

FIG. 1D is a highly simplified view of the patcher engine 22 which may be provided with a pulley 24 that rotates during operation of engine 22.

An electrical generator 26 having a pulley 28 can be mounted on a drive shaft 30 and driven by pulley 24 through a belt 32.

During operation of engine 22, the engine delivers mechanical power to generator 26 to charge a battery pack 34, which provides electrical energy to all of the patcher's electro-mechanical devices utilized during the patching mode.

The battery pack 34 is charged preferably whenever engine 22 is running, which is typically when the patcher 10 moves from the home base and from one location to the next to perform patching operations and also when returning to the home base.

A logical circuit 36 monitors stored energy in the battery pack 34. When the patcher 10 is in the patching mode, the controller 100 preferably provides the logical circuit 36 with a signal to decouple the engine 22 from the drive shaft. The controller 100 is preferably configured to sense when the energy stored in the battery 34 drops below a predetermined level. Accordingly, in such case, when the energy in the battery pack 34 drops below a given level, the controller 100 provides the logical circuit 36 with a signal indicating that charging is needed. Preferably, in response to that signal, the engine 22, which is normally turned off during the patching mode, is turned on to cause the generator 26 to charge the battery pack 34. While the engine 22 is driving the generator 26 in the patching mode, the engine remains decoupled from the drive shaft and does not propel the patcher 10. In this situation, power can be provided directly from the generator 26 to the patcher's patching operation components during the patching mode while the generator also charges the battery pack.

An ignition output 36a controls turn-on of the engine 22. An output 36b of the logical circuit 36 disengages the clutch prior to starting engine 22.

A hydraulic pump 38 has a pulley 41 mounted on its input shaft 42. A belt 44 couples mechanical energy from engine 22 to hydraulic pump 38.

The hydraulic pump 38 selectively provides hydraulic power through a hydraulic line 38a to several hydraulic cylinders described below.

As shown in FIG. 1D, an electric DC motor 25 can be associated with the patcher's drive shaft to drive the patcher 10 while it is in the patching mode, where the engine 22 is decoupled from the drive shaft. The electric DC motor 25 can be powered directly by the generator 26 or by the battery pack 34. The electric DC motor 25 is also controlled by the controller 100 through the logical circuit 36.

Figure 7:
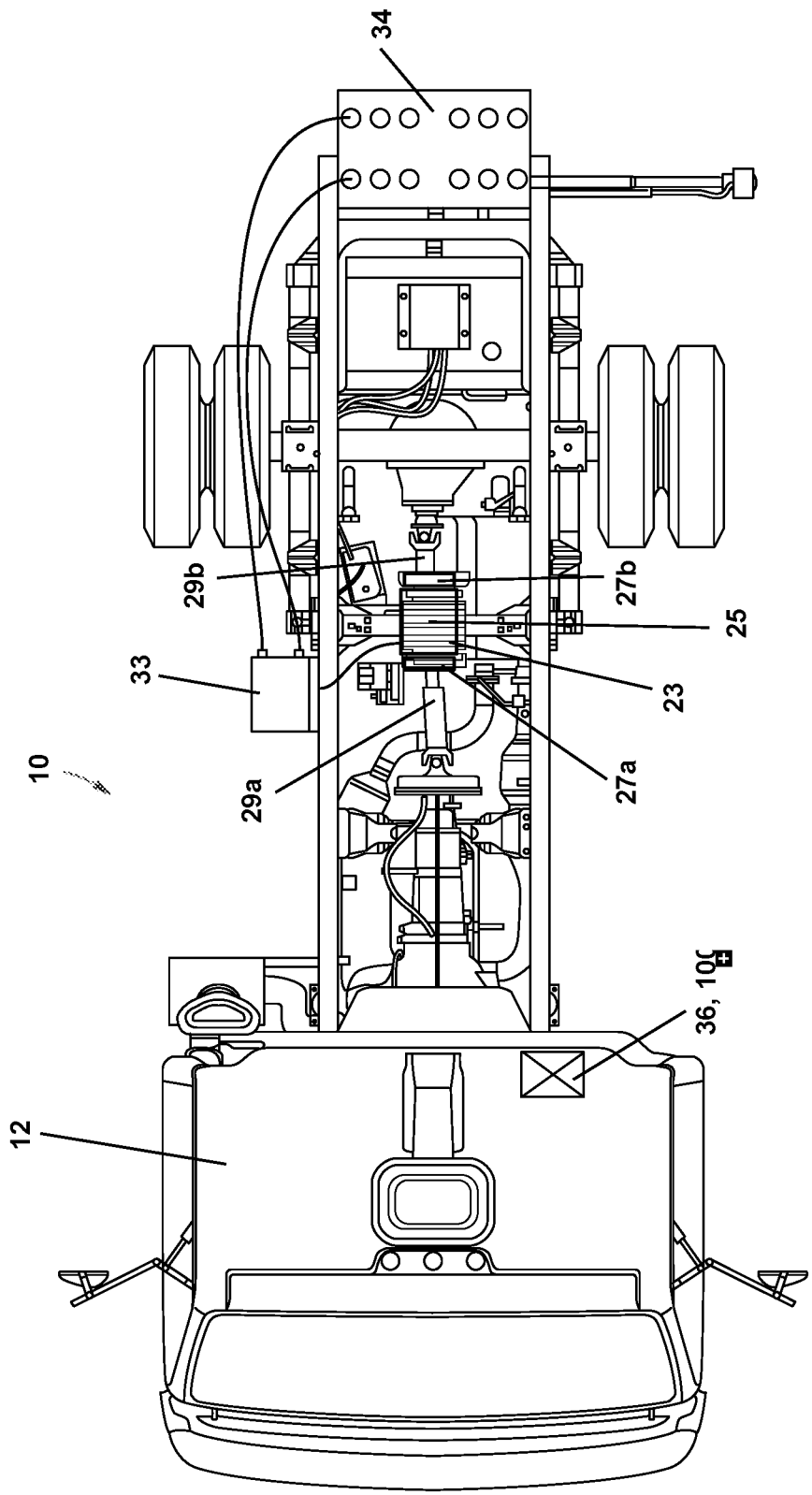
FIG. 7 is a top view of the chassis of the patcher vehicle showing a transfer case arranged around the front and rear drive shafts of the patcher engine.

FIG. 7 provides a simplified view of how the electric DC motor 25 can be arranged on the patcher 10 to drive the patcher 10. A transfer case 23 that includes the electric DC motor 25, a front clutch 27a, and a rear clutch 27b is arranged between the front drive shaft 29a and the rear drive shaft 29b of the patcher 10. As discussed above, the electric DC motor 25 can be powered by the generator 26 or by the battery pack 34. Where the electric DC motor 25 is powered by the battery pack 34, a voltage converter 33 is provided to convert the voltage of the battery pack 34 to the proper voltage for the electric DC motor 25. For example and without limitation, the battery pack 34 can provide a voltage of 12-36 volts, which the voltage converter 33 then converts to a voltage of 110-360 volts for the electric DC motor 25.

When the patcher 10 is in a normal driving mode, the front and rear drive shafts 29a, 29b are engaged through the patcher's transmission, and the patcher engine 22 drives the front and rear drive shafts 29a, 29b to propel the patcher 10. In the driving mode, the electric DC motor 25 is disengaged and spins freely. When the patcher 10 is placed in the patching mode, the engine 22 is shut off, and the electric DC motor 25 is used to propel the patcher 10, preferably, at approximately 1-2 mph while the patching operation is carried out. Specifically, when an operator places the patcher 10 in the patching mode, the controller 100 sends a signal through the logical circuit 36 to the transfer case 23 and electric DC motor 25. The front clutch 27a is disengaged from the front drive shaft 29a, while the rear clutch 27b is engaged with the rear drive shaft 29b. The electric DC motor 25 is activated to drive the rear drive shaft 29b and propel the patcher 10 forward.

For example and without limitation, an electric DC motor of 240 volts can provide approximately 100 horsepower, which is sufficient to drive the patcher 10 at low speeds during the patching operation. The speed of the patcher 10 while in the patching mode can be controlled by an operator from the cabin 12. An electronic control unit including the controller 100 and the logical circuit 36 is preferably located in the cabin 12 and connected to the accelerator pedal. The accelerator pedal acts as a potentiometer while the patcher 10 is in the patching mode. Increased depression of the accelerator pedal reduces the resistance and increases the amount of current from the converter 33 to the electric DC motor 25, which changes the speed of the patcher 10. The electric DC motor 25 is only engaged with the rear drive shaft 29b when the patcher 10 is in the patching mode. When the patcher 10 is placed in the normal driving mode, the rear clutch 27b is disengaged from the rear drive shaft 29b, and the electric DC motor 25 spins freely. In this manner, the patcher engine 22 preferably remains off during the patching mode, while the electric DC motor 25 powers all of the patching functions and the movement of the patcher 10.

The patcher engine 22 can be turned on during the patching mode to run the generator 26, when needed to recharge the battery pack 34 or power the components. However, it is preferred to have the patching operation performed exclusively using battery power.

Figures 1, 2A:
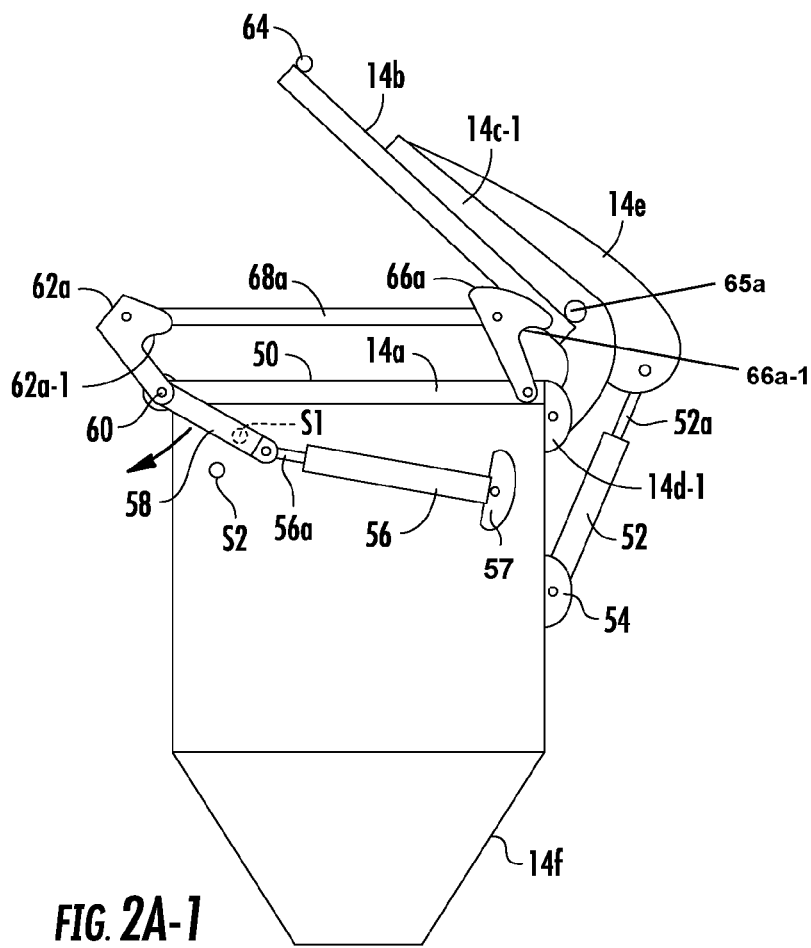
FIG. 2A-1 is a rear end view of the aggregate tank shown in the embodiment of FIG. 1 with the aggregate tank lid shown in the open position.
Figures 2, 2A:
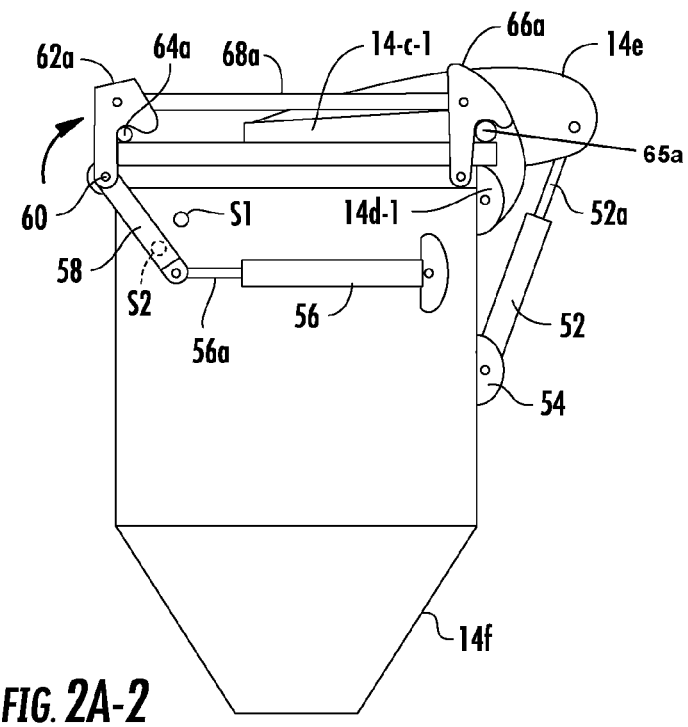
Figure 2B:
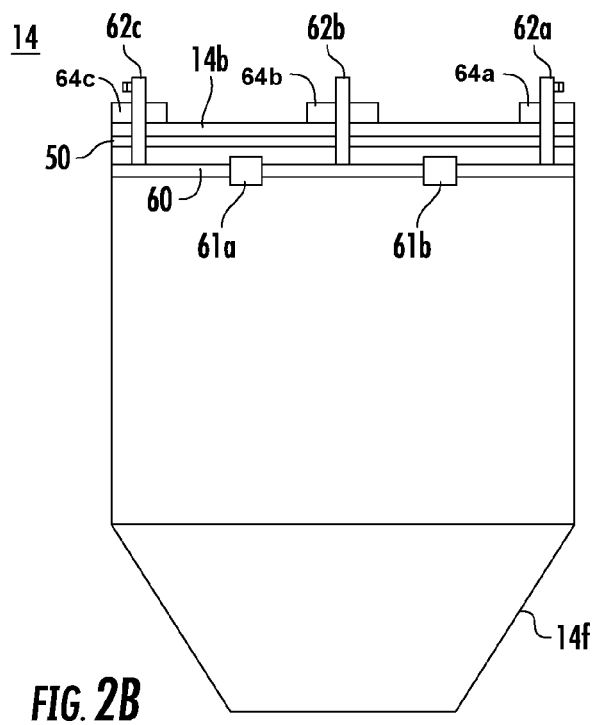
FIG. 2B is a side view of the aggregate tank with the aggregate tank in the closed position.
Figure 2C:
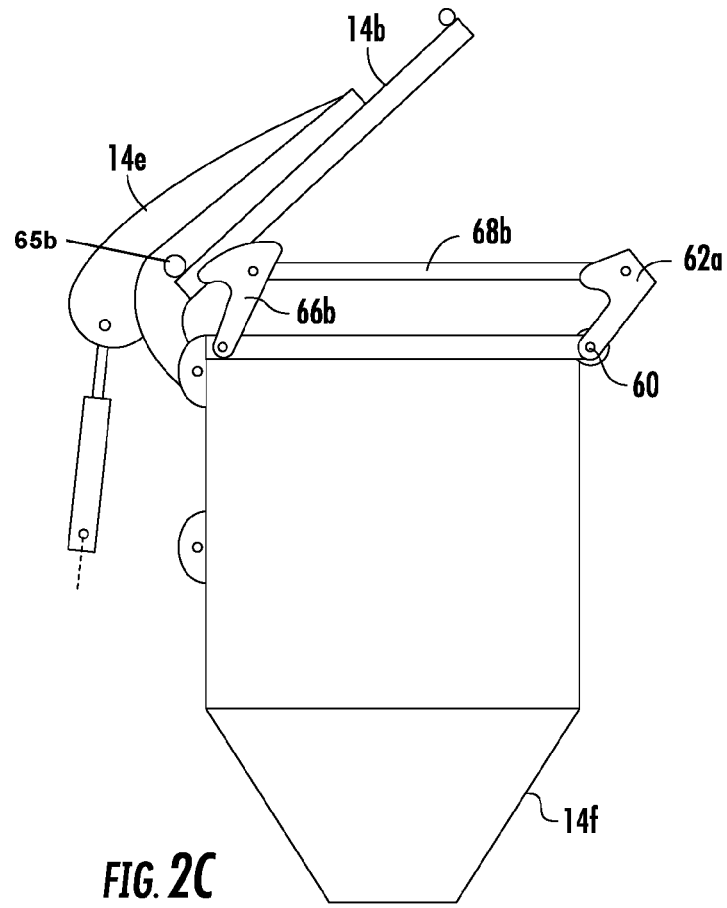
FIG. 2C is a front end view of the aggregate tank showing the aggregate tank lid in the open position.
Figure 2D:
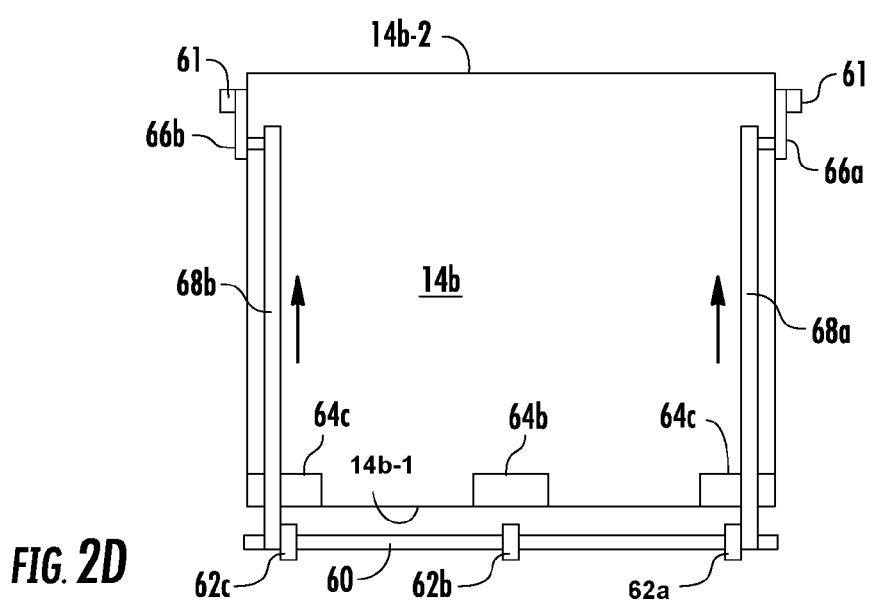
FIG. 2D is a top view of the aggregate tank showing the aggregate tank lid closed and the clamping arms displaced from the clamping position.

The aggregate storage tank 14 is shown in FIGS. 2A-1 through 2D. FIG. 2A-1 shows the aggregate tank 14 with the external wall 16 removed. FIGS. 2B-2D respectively show side, front end and top views of the aggregate tank 14. FIGS. 2A-1 and 2A-2 respectively show the rear end view of the aggregate tank 14 with its lid opened and closed.

Making reference to FIGS. 2A-1 and 2A-2, aggregate tank 14 is a hollow tank and the top portion thereof has a rectangular shape. The rectangular-shaped lip 14a provided at the top open end of the aggregate tank 14 is fitted with a rubber or rubber-like resilient, compressible gasket 50.

A lid 14b is swingably mounted to the exterior of aggregate tank 14. A pair of reinforcing ribs 14c-1, 14c-2, shown also in FIG. 1A, are secured to the top surface of lid 14b and their free ends are hingedly connected through pins to brackets 14d-1, 14d-2.

A centrally located rib 14e is secured to an intermediate portion of the lid 14b. The lid 14b moves between the closed and opened positions under operation of controller 100, which operates a cylinder 52 having a piston 52a whose free end is pivotally coupled to a lower end of bracket 14e. The cylinder 52 is pivotally mounted by a pin to a bracket 54. A clamp controlling cylinder 56 is provided to provide a lid clamping function.

Cylinders 52 and 56 are sequentially controlled to unclamp and open lid 14b by pressing a manually operable button B1 on joystick 40 in the cabin 12 as shown in FIG. 1C, to open lid 14b. The operating button can be interfaced with the controller 100 to permit lifting of lid 14b when the engine 22 is running or when the engine 22 is not running.

One end of the clamp controlling cylinder 56 is pivotally mounted by a pivot pin to a bracket 57 secured to the aggregate tank. One end of a piston 56a of the cylinder 56 is pivotally mounted by means of a pivot pin to an end of a lever arm 58, which is fixedly secured to one end of rotatable shaft 60 that extends through openings defined by brackets 61a, 61b shown in FIG. 2b. Shaft 60 is free to rotate about its longitudinal axis. A first clamping member 62a is secured, preferably by welding, to one end of shaft 60. Shaft 60 is also shown in the top view, FIG. 2D, of the aggregate tank 14. Two more clamping members 62b, 62c, are secured to rotatable shaft 60 preferably at equi-spaced intervals along shaft 60.

The three clamping members 62a, 62b, 62c, together with clamping arms 66a, 66b, cooperate to air-tightly clamp the lid 14b to the top of aggregate tank 14, as more fully described below. Three annular-shaped members 64a, 64b and 64c are secured to the top of lid 14b and adjacent to one side 14b-1, of lid 14b and respectively cooperate with clamping members 62a-62c to lock clamping members 62a-62c in the locked position as described below.

Clamping is also provided by the pair of clamping arms 66a, 66b arranged adjacent to the side 14b-2 of the aggregate tank lid 14b. Additional annular-shaped members 65a, 65b are secured to the lid 14b and respectively cooperate with clamping members 66a, 66b to lock clamping members 66a, 66b in the locked position. An elongated shaft 61 extends through side 14b-2 of lid 14b. The clamping arms 66a, 66b are mounted on and configured to rotate about shaft 61.

A pair of elongated connector rods 68a, 68b are pivotally mounted at one of their ends to the left-hand and right-hand clamping members 62a, 62c by means of suitable pivot pins. The opposite ends of connector rods 68a, 68b are pivotally coupled to clamping arms 66a, 66b by means of suitable pivot pins.

The clamping/unclamping operation of the aggregate tank lid 14b is preferably controlled by an operator from the cabin 12. Controller 100, shown in FIG. 5, senses the condition of the motor and clutch, through suitable sensors, not shown for purposes of simplicity, and, upon receipt of a signal responsive to operation of button B1 to initiate lifting of lid 14b, controller 100 provides a signal to a valve control device 45 which initially opens a valve (not shown) in device 45 to deliver hydraulic fluid under pressure to cylinder 56 in a direction to rotate clamping members 62a-62c counter-clockwise from the clamped position shown in FIG. 2A-2 to the unclamped position shown in FIG. 2A-1, when the engine 22 is running and disengaged from the drive shaft. Where electric linear actuators are used to drive the cylinders 52, 56 instead, the clamping/unclamping operation of the lid 14b can take place both when the engine 22 is running and when the engine 22 is off.

The clamping arms 66a-66b are also simultaneously rotated in the counter-clockwise direction to the unclamped position by means of connector rods 68a, 68b.

Figure 5:
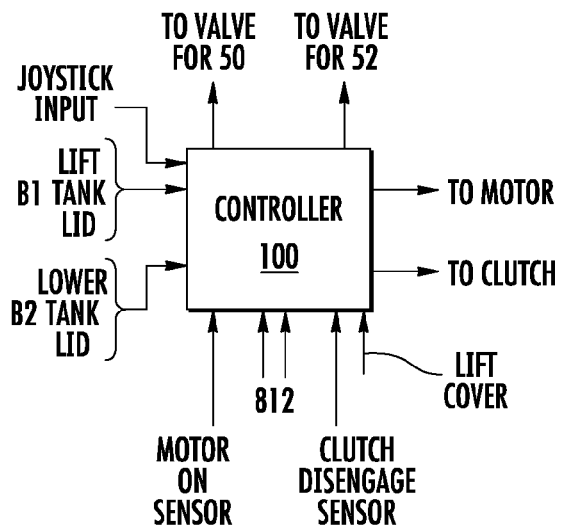
FIG. 5 is a simplified diagram of the electronic controller for controlling operations of the patcher of FIG. 1.

The sensor S1, along one side of aggregate tank 14, as shown in FIG. 2A-2, senses that lever arm 58 has moved to the position shown in FIG. 2A-1 providing a signal to controller 100, see FIG. 5, which closes the first-mentioned valve in device 45 to halt delivery of hydraulic fluid to cylinder 56 and opens a second valve in device 45 to deliver hydraulic fluid to cylinder 52 in a direction to open lid 14b. The second-mentioned valve may be a sequence-type valve which stops delivery of hydraulic fluid to cylinder 52 when the back pressure acting on cylinder 52 reaches a given level.

The reverse (i.e., closing) operation is performed when the lid 14b is open and initially cylinder 52 is operated to close lid 14b. Button B2, shown in FIG. 1C is pressed, causing controller 100 to initially operate the second-mentioned sequence-type valve in device 45 to deliver hydraulic fluid to cylinder 52 in a direction to close lid 14b. The second-mentioned sequence-type valve operates in reverse order halting the flow of hydraulic fluid to cylinder 52 when the back pressure working against the hydraulic pressure driving piston arm closed reaches a given level to stop delivery of hydraulic fluid to 52. Controller operates the first-mentioned valve in device 45 to deliver hydraulic fluid to cylinder 56 in a direction to move lever arm 58 from the position shown in FIG. 2A-1 to the position shown in FIG. 2A-2 to move thereby move the clamping members 62a-62c and 66a, 66b to the clamped position. When lever arm 58 reaches the position shown in FIG. 2A-2, sensor S2 sends a signal to controller 100 to operate the first-mentioned valve to stop the flow of hydraulic fluid.

When the lid 14*b* is lowered to the closed position and cylinder 56 is operated, the shape of the clamping members 62*a*-62*c* and 66*a*, 66*b* is such as to press the lid 14*b* against the resilient compressible gasket 50 to provide a superior, airtight seal. Clamping members 62*a*-62*c* are locked into the clamped position when the annular-shaped members 64*a*-64*c* enter into the U-shaped regions 62*a*-1-62*c*-1 of clamping members 62*a*-62*c* thereby eliminating the need for providing hydraulic fluid under pressure to cylinder 56. Clamping members 66*a*, 66*b* are locked into the clamping position when additional annular-shaped members 65*a*, 65*b* enter into the U-shaped regions 66*a*-1 and 66*b*-1 of clamping members 66*a*, 66*b*, as shown in FIG. 2A-2.

The use of a large size opening and a large size lid 14*b* to cover the opening greatly simplifies and speeds up the filling operation since the lid clamping/unclamping assembly significantly reduces the time to clamp/unclamp the lid compared with present devices requiring manual operations.

Figure 3:
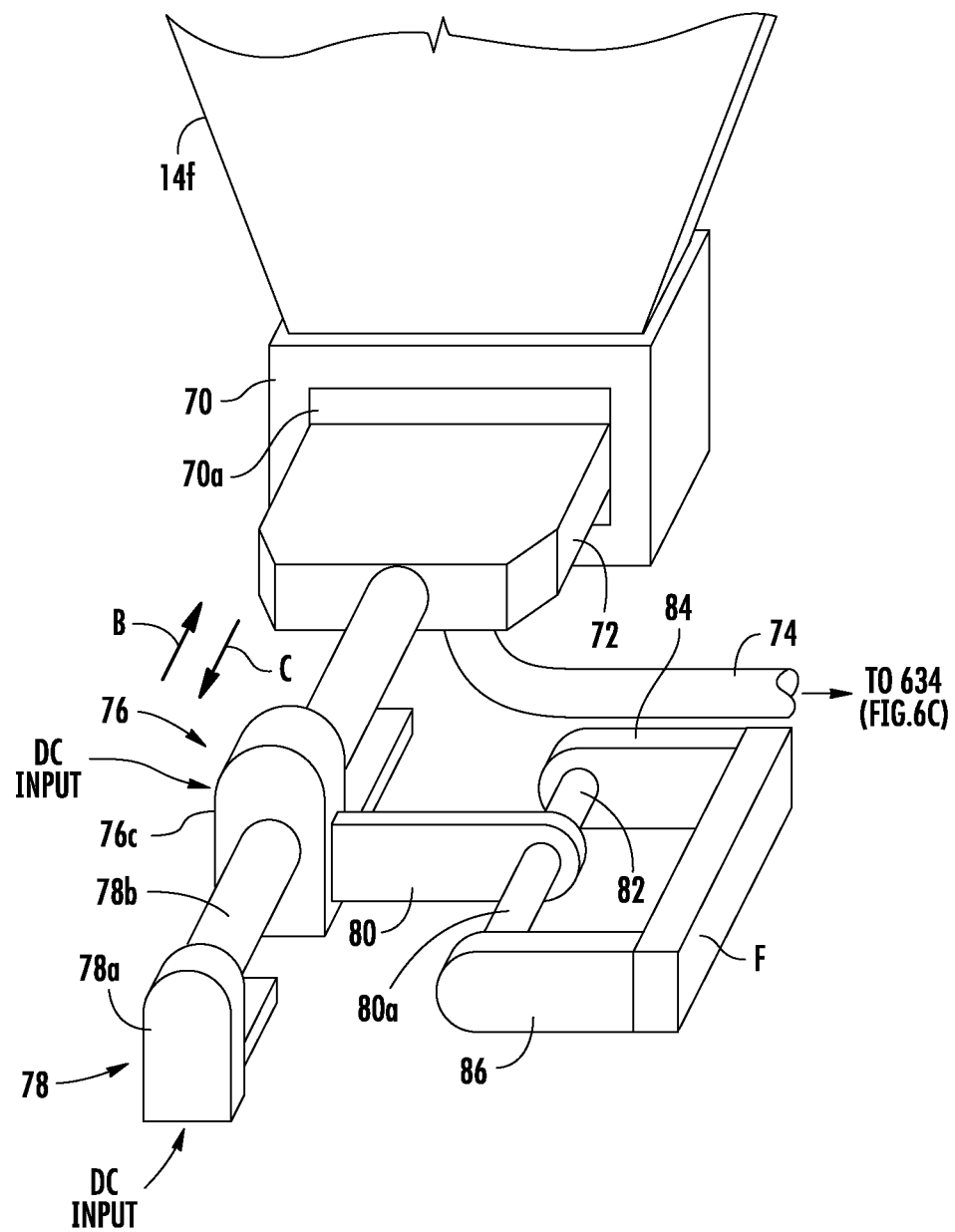
FIG. 3 is a perspective view showing two tandem linear accelerators utilized for opening and closing an aggregate flow path and providing flow rate control for controlling the flow rate of aggregate from the aggregate tank.
Figure 6C:
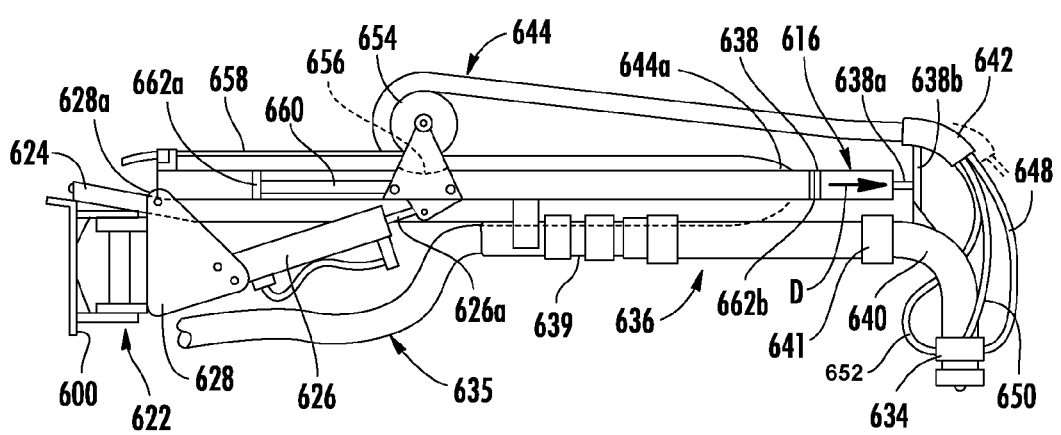

FIG. 3 is a perspective view of the electrically operated flow control assembly for selectively opening, closing and adjusting the dispensing rate of aggregate from aggregate tank 14 to the dispensing head 634 shown in FIG. 6C. The lower, tapered portion 14*f* of aggregate tank 14 terminates in a rectangular-shaped, parallelepiped base member 70 having an elongated guide slot 70*a* which slideably receives and guides a plate 72 which is slidable within slot 70*a*.

The bottom end of base member 70 has an opening communicating with conduit 74 for conveying aggregate to the dispensing head 634 to be described with reference to FIG. 6C.

Figure 4:
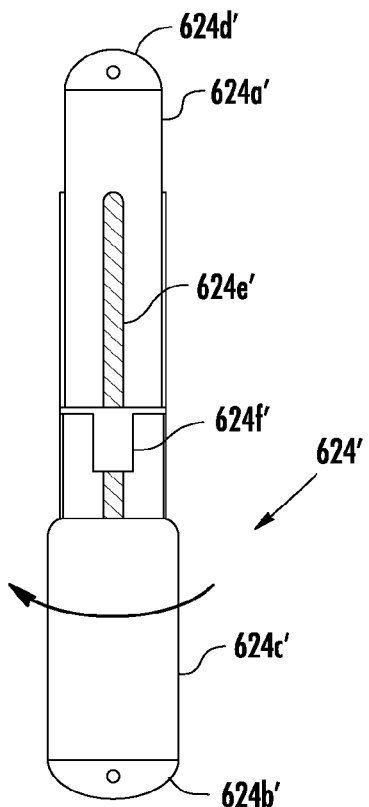
FIG. 4 is a simplified diagram of a linear accelerator which may be used in the patcher of FIG. 1.

The movement of plate 72 is controlled by first and second linear accelerators 76, 78 which are coupled in tandem. First and second linear accelerators 76, 78 may, for example, be one of: a ball screw and ball nut; hybrid Acme; or Acme screw linear accelerator having a DC input voltage. Linear accelerators suitable for use in the FIG. 3 embodiment are the A-Track, B-Track and M-Track linear actuators available from Warner Electric. FIG. 4 is a simplified sectional view of one type of linear accelerator, as will be described.

The body portion 78*a* of the second linear accelerator 78 is secured to the patcher frame (not shown for purposes of simplicity) and has its driving output end 78*b* arranged to drive the first linear accelerator 76 to move plate 72 in either the closing direction shown by arrow B or the opening direction shown by arrow C as determined by the polarity of the DC voltage applied to the second linear accelerator 78.

A stabilizing arm 80 has one end secured to the body portion 76*c* of the first linear accelerator 76. The opposite end of stabilizing arm 80 has an opening 80*a* which slidably receives a guide shaft 82 fixedly mounted between a pair of arms 84, 86 secured to a frame portion F of the patcher.

To close the dispensing opening in base member 70, the second linear accelerator 78 drives the first linear accelerator 76 in the closing direction shown by arrow B. Stabilizing arm 80 also moves in the direction of arrow B within the end limits determined by arms 84, 86. This arrangement prevents the first linear accelerator 76 from experiencing any rotation about its longitudinal axis as it moves either forward or rearward along the longitudinal axis of the driving end 76*d* of the first linear accelerator 76, as shown by arrows B, C.

The stroke length of the second linear accelerator 78 is preferably sufficient to close the opening in the bottom, dispensing end of the aggregate tank 14. The first linear accelerator 76 cooperates with the second linear accelerator 78 to selectively move plate 72 to either a fully open or a fully closed position or an open position in which the flow rate of aggregate from the bottom opening is regulated over a given range between being fully opened and fully closed by selective operation of the first and second linear accelerators 76, 78.

Making reference to U.S. Pat. No. 5,263,790, incorporated herein by reference and invented by two co-inventors, one of which is an inventor of the present application, there is disclosed a control assembly shown in FIGS. 4-7 for controlling a rate of flow of aggregate from an opening in the base member 70 of an aggregate tank to a conduit for conveying aggregate to the patcher dispensing assembly. Plate 72 may be slideably mounted within a structure taught by U.S. Pat. No. 5,263,790 or any other suitable opening assembly and has an annular opening which allows the maximum flow rate of aggregate when the annular opening is aligned with the opening in the base member 70. Alternatively, the flow rate of aggregate can be reduced by offsetting the opening in plate 72 relative to the opening in the base member 70. The shapes and relative sizes of the opening in the base member 70 and the plate 72 may be changed to achieve a variety of different objectives. One suitable arrangement is shown in FIGS. 5 and 6 in U.S. Pat. No. 5,263,790.

The first and second linear accelerators 76, 78 may be operated either alone or in combination with one another to fully close or fully open the aggregate dispensing opening as well as accurately controlling the rate of flow of aggregate by controlling the size of the opening by selective operation of the first and second linear accelerators 76, 78 which are connected in tandem.

In a preferred embodiment, the second linear accelerator 78 has a greater stroke length than the first linear accelerator 76 so that the second linear actuator 78 is configured to move the slide plate a greater distance than the first linear actuator 76 which is preferably configured to provide smaller incremental linear movements to achieve increased precision of the desired rate of flow. The second linear accelerator 78 may be configured to operate at a first speed to rapidly move to the slide plate to a position to obtain a "rough" estimate of the desired flow rate, and the first linear accelerator 76 may be configured to operate at a second slower speed to then move the slide plate to "fine tune" the flow rate and thereby more accurately control the flow rate. The ability to adjust the flow rate employing the embodiment of FIG. 3 further provide easy and rapid adjustment of the flow rate to accommodate different size aggregate. The use of linear accelerators operating in tandem may also be used to control dispensing of a liquid as well as aggregate.

In one embodiment, battery pack 34, shown in FIG. 1D, may be operated to provide substantially exclusive electrical power during a patching mode, eliminating the emission of toxic pollutants from the patcher exhaust, as well as other toxic generating devices thereby significantly reducing the impact of these toxic emissions upon the patching personnel as well as other thing/persons in the surrounding area sensitive to such emissions.

Although the battery pack 34 is configured to be capable of providing the necessary power for up to 8 hours during the patching mode, sensors are preferably provided to start the patcher engine for the purpose of charging the battery pack when the sensor device 36 detects that the stored energy from the battery pack 34 drops below a given threshold level, as will be described below in detail.

FIGS. 6A-6C are respectively top, side and front views showing the articulated patching boom assembly shown in the patching mode (FIGS. 6A and 6C) and the articulated patching boom assembly in an upright position for patcher travel during a non-patching mode (FIG. 6B).

In the front view shown in FIG. 6B, the articulated patching boom assembly is in an upright travel position. The articulated patching boom assembly 621 is mounted upon one end of a rugged mounting bracket 600 removed from the driver's side of cabin 12. Preferably, the articulated patching boom assembly 621 is mounted at approximately the center of the cabin 12 between the driver's side and the passenger's side. The articulated patching boom assembly 621 is pivotally mounted to the front end of the cabin 12 to enable the boom assembly to swing in a horizontal plane by means of piston rod 624a of pneumatic cylinder 624, shown in FIG. 6A. The articulated patching boom assembly 621 is further swingable in a vertical plane under control of cylinder 626. Detailed views of the boom assembly 621 and activating cylinders 624 and 626 being respectively shown in FIGS. 6A and 6C. The articulated patching boom assembly 621 is pivotally mounted at 622 to move clockwise or counterclockwise in a horizontal plane as shown by arrow A1, under control of piston rod 624a of cylinder 624. The articulated patching boom assembly 621 is further pivotally mounted to rotate in a clockwise or counterclockwise direction about a pivot point 628a of bracket 628, which is oriented so as to be perpendicular to the pivot point of bracket 622, as shown in FIG. 6C. When the articulated patching boom assembly 621 is in a lowered position during the patching mode, as shown in FIG. 6A, the boom assembly 621 is movable in front of and beyond the width of the vehicle. The cylinder 624 and piston rod 624a can drive the boom assembly 621 clockwise past the position shown in dotted lines in FIG. 6A, until the boom assembly 621 is substantially parallel with a front bumper of the patcher 10 and the free end of the boom assembly 621 extends past the width of the vehicle.

A flexible hose 635 communicates between aggregate tank 14 and a mixing head 634 arranged at the free end of the articulated patching boom assembly 621. Flexible hose 635 couples the aggregate tank 14 to mixing head 634 through a telescoping delivery assembly 636.

The details of the movement of the articulated patching boom assembly 621 and its various components are set forth in U.S. Pat. No. 5,419,654 which is incorporated herein by reference and further details of the articulated patching boom assembly and its operation are omitted herein for purposes of simplicity.

It is sufficient to understand, however, that a heated asphalt emulsion and aggregate are respectively fed to the mixing head 634 under suitable air pressure. Aggregate is fed to mixing head 634 through the flexible hose 635 while liquid emulsion is fed to the mixing head through lines 648, 650 and 652.

The telescoping delivery assembly 636 is extended and retracted through the cylinder 638, which includes a piston rod 638a that is connected to a bracket 638b. The lower end of the bracket 638b can be connected to an elbow 640 coupled to the downstream end of the telescoping delivery assembly 636, while the upper end of the bracket 638b can be connected to a member 642 that supports the downstream end of a hollow, insulated non-collapsible hose 644.

The hollow, insulated non-collapsible hose 644 typically contains five (5) different fluid carrying lines, including lines 648-652, as well as electrical wires. Non-collapsible hose 644 is maintained substantially taut regardless of the expansion or retraction of the telescoping delivery tube assembly 636, by means of spring 658 and pulley 654. The non-collapsible hose 644 is fixed at end 644a and extends rearwardly and passes around pulley 654, pivotally mounted between a pair of brackets 656, 656 (as shown in FIGS. 6A and 6C), and extends forwardly and is fixed to the bracket 638b at the free end of the piston rod 638a. Brackets 656 are slidable along guide slots 660. When piston cylinder 616 extends piston rod 638a, bracket 638b extends the length of telescoping boom 638a, and also moves the end of the non-collapsible hose 644 coupled to member 642 forward, as shown by arrow D, causing bracket 656 to move forward half the distance that bracket 638b is moved and causing spring 658 to extend. When the telescoping boom is retracted by piston rod 638a the extended spring 658 contracts, thereby maintaining the non-collapsible hose 644 substantially taut to thereby prevent liquid flow from being constricted or closed off due to pinching of the non-collapsible hose 644. Piston cylinder 616 also moves dispensing head 634 in the direction D. The forward end of the flexible hose 635 is coupled to the rear end of a hollow, telescoping section 639, which extends when the dispensing head moves in direction D. Piston cylinders 624, 626 and 616 may be hydraulic and selectively operated by joystick 40.

One or more of the hydraulic cylinders 624, 626 and 616 may be replaced by electrically operated devices. For example, an electrically-operated linear accelerator 624', shown in FIG. 4, may replace cylinder 624 and be pivotally mounted at end 624b' to bracket 601 (see FIG. 6A) and is electrically operable to selectively extend or withdraw arm 624a', the free end 624d' being pivotally coupled to the articulated patching boom assembly 621 by bracket 621a.

The electric motor 624c' in linear accelerator 624', rotates threaded shaft 624e', driving the nut inwardly or outwardly, depending on the direction of rotation of shaft 624e'. Nut 624f' drives arm 624a' in or out to move the articulated patching boom assembly clockwise or counterclockwise about the pivot point of bracket 622 as shown by arrow A1 in FIG. 6A.

Hydraulic cylinder 626 may likewise be replaced by a linear accelerator similar to the linear accelerator 624', to move the articulated patching boom assembly 621 to a position which is substantially close to a horizontal plane for placement above a pothole or the like, in readiness for a patching operation.

Movement of the articulated patching boom assembly 621 in first and second planes perpendicular to one another can thus be performed by first and second linear accelerators, operating in a manner similar to the hydraulic cylinders 624 and 624 shown in FIGS. 6A and 6C. Since the mini-patcher of the present application is reduced in size in order to be able to perform patching operations confined areas not capable of being serviced by larger patchers and to reduce the number of components, the telescoping sections of presently available boom assemblies may be either reduced in number or eliminated. The patcher 10 has a width perpendicular to a forward direction of travel. The articulated patching boom assembly 621 described herein is designed to be movable in the patching mode to a lowered position in front of and beyond the width of the patcher 10 and in a travel mode to a upright travel position as shown in FIG. 6B. The articulated patching boom assembly 621 is moved to the upright travel position by extending piston rod 624a to move the boom assembly 621 in a horizontal direction and extending piston rod 626a to raise the boom assembly 621 in a vertical direction, such that the boom assembly is brought upright and positioned in front of and within a width of the patcher 10 where it does not substantially impair the view of a driver that is driving the patcher 10 in the forward direction. As shown in FIG. 6B, when the articulated patching boom assembly 621 is in the upright travel position, it is positioned in front of the passenger's side of the cabin 12 and arranged at an angle to minimize obstruction of a windshield of the cabin 12. This ensures safe travel of the patcher 10 along roadways and the like. The free end of the articulated patching boom assembly 621 is preferably positioned within the width of the patcher 10. A locking mechanism 13 can be provided to secure the articulated patching boom assembly 621 in the upright travel position. The controller 100 can be configured to operate the locking mechanism 13 to selective release or lock the articulated patching boom assembly 621.

The articulated patching boom assembly 621, when oriented in the upright travel position, preferably does not extend beyond the left or right-hand sides of the patcher, thereby eliminating a potentially severe safety hazard during movement of the patcher vehicle when travelling to or from a patching site. Although the articulated patching boom assembly 621, when in the upright travel position shown in solid-line fashion in FIG. 6B, may be thought to be in violation of safety requirements and/or laws, Applicant's mini-patcher has been approved for travel on roads and highways.

When the articulated patching boom assembly is moved to a substantially horizontal position as shown in solid-line and dotted-line fashion in FIG. 6A, it can be seen that the dispensing assembly can extend well beyond the opposite longitudinal sides of the cabin 12, posing a potentially serious safety hazard if the mini-patcher were to attempt to travel along the roads and highways with the dispensing assembly lying in a substantially horizontal plane.

The ability to orient the articulated patching boom assembly 621 in the vertical direction to bring it into the upright travel position significantly reduces, if not totally eliminating any safety hazards during patcher travel. When the boom assembly is in the upright travel position, it is furthest removed from the driver, minimizing obstruction of the driver's view of the road.

The electrically-operated linear accelerators are capable of having their linearly movable arms retain their position when electrical power is removed from the linear accelerator.

Electrically-operated linear accelerators can be provided for extending and retracting the articulated patching boom assembly 621 and for lateral movement of the dispensing head 634 in a horizontal plane in order to simply and accurately position the articulated patching boom assembly above a pothole, for example, in readiness for a patching operation. Similarly, any of the hydraulically operated devices described herein may be replaced by suitable linear accelerators or other devices capable of providing the motions described. Also, any of the linear accelerators described herein may be replaced by suitable cylinders or other devices capable of providing the motions described. Generally, for the most compact arrangement, the use of linear accelerators is preferred.

As was previously set forth, the sensor employed to detect reduction of the stored energy in the battery pack 34 below a given threshold, initiates operation of the patcher engine in order to charge the battery pack, subject to the engine being in the idle position disengaged from the drive shaft and turned on.

Although the patcher and its operating components and devices have been described as being reduced in size to enable its use in confined spaces, it should be understood that all of the components and devices described herein may also be used in patchers regardless of their size.

What is claimed is:

1. A patching apparatus comprising:
a self-propelled vehicle having an articulated patching boom assembly mounted at a front end of the vehicle;
the articulated patching boom assembly being mounted to be independently movable in both a horizontal direction and a vertical direction and configured to selectively deploy patching material during a patching mode;
first and second driving devices for independently moving the articulated patching boom assembly respectively in the horizontal and vertical directions;
a battery pack mounted on the vehicle for powering the first and second driving devices,
drive wheels configured to propel the vehicle;
an electric motor operatively associated with the battery pack and configured to engage the drive wheels and propel the vehicle in the patching mode;
a non-electric engine configured to engage the drive wheels and propel the vehicle in a non-patching mode; and
an electric generator operatively associated with the non-electric engine and configured to selectively charge the battery pack when the non-electric engine is turned on.

2. The apparatus of claim 1 wherein at least one of the first and second driving devices is an electrically driven linear actuator.

3. The apparatus of claim 1 further comprising:
a controller configured to turn on the non-electric engine responsive to a signal indicating that the energy stored in the battery pack is less than a given threshold and a signal indicating that the non-electric engine is disengaged from the drive wheels.

4. The apparatus of claim 1 further comprising:
a non-electric engine;
an electric generator driven by the non-electric engine; and
a controller configured to turn on the non-electric engine responsive to a signal indicating that the energy stored in the battery pack is less than a given threshold.

5. The apparatus of claim 1 wherein:
the vehicle has a width perpendicular to a forward direction of travel; and
the articulated patching boom assembly is movable in the patching mode to a lowered position in front of and beyond the width of the vehicle and in a travel mode to a position where the articulated patching boom assembly is in an upright position in front of and within the width of the vehicle such that it does not substantially impair visibility of a driver that is driving the vehicle in the forward direction to thereby enable safe travel along roadways and the like.

6. A patcher vehicle for repairing potholes and the like comprising:
an engine configured to propel the vehicle by selectively coupling output power from the engine to at least one set of drive wheels in a non-patching mode;
a rechargeable battery pack;
an electric generator driven by the engine configured to charge the battery pack;
linear actuators powered by the battery pack and configured to selectively move an articulated patching boom assembly in first and second mutually perpendicular directions during a patching operation;
a power monitor configured to monitor energy stored in the battery pack;
a controller configured to couple the electric generator to the engine when stored energy in the battery pack is below a given threshold to initiate charging of the battery pack; and
the controller configured to decouple the engine from the at least one set of drive wheels during the patching operation.

7. The vehicle of claim 6 further comprising an electric motor, wherein the controller is configured to couple the electric motor to the at least one set of drive wheels during the patching operation to selectively move the vehicle.

8. The vehicle of claim 6 wherein the controller is configured to sense when energy stored in the battery pack is below a predetermined level, and in response couple the electric generator to the engine, and provide power from the electric generator to the linear actuators during the patching operation and while the engine is decoupled from the at least one set of drive wheels.

9. The vehicle of claim 6 including a storage tank assembly coupled with an articulated patching boom assembly to provide aggregate material to be dispensed by the articulated patching boom assembly during the patching operation.

10. The vehicle of claim 6 including an aggregate tank and an associated flow control assembly coupled with an articulated patching boom assembly to selectively provide aggregate material to the articulated patching boom assembly during the patching operation.

11. The vehicle of claim 10 wherein the aggregate tank is configured as a storage tank assembly.

\* \* \* \* \*